United States Patent [19]

Langner

[11] Patent Number: 4,558,972
[45] Date of Patent: Dec. 17, 1985

[54] SUBSEA PIPELINE CONNECTION

[75] Inventor: Carl G. Langner, Spring, Tex.

[73] Assignee: Shell Oil Company, Houston, Tex.

[21] Appl. No.: 499,013

[22] Filed: May 27, 1983

[51] Int. Cl.$^4$ .......................... F16L 1/04; E21B 43/01
[52] U.S. Cl. .................................... 405/169; 405/171; 166/343
[58] Field of Search ....................... 405/168, 169, 170; 166/341-348

[56] References Cited

U.S. PATENT DOCUMENTS

| | | | |
|---|---|---|---|
| 3,298,092 | 1/1967 | Dozier et al. | 166/343 X |
| 3,426,842 | 2/1969 | Corley et al. | 166/344 |
| 3,431,739 | 3/1969 | Richardson et al. | |
| 3,482,601 | 12/1969 | Drouin | 166/344 X |
| 3,695,350 | 10/1972 | Petersen | 405/169 |
| 3,710,859 | 1/1973 | Hanes et al. | 166/346 X |
| 3,716,100 | 2/1973 | Nelson | 166/344 X |
| 4,145,909 | 3/1979 | Daughtry | 405/168 |
| 4,367,980 | 1/1983 | Ames et al. | 405/169 |
| 4,371,005 | 2/1983 | Morrill et al. | 405/169 X |

FOREIGN PATENT DOCUMENTS 2448091 10/1980 France .................................. 405/168
1603548 11/1981 United Kingdom ................ 405/170

OTHER PUBLICATIONS

A Technical Description of Multiple Wellhead Manifold Control System, Offshore Systems Inc., Nov. 26, 1969.

Primary Examiner—Dennis L. Taylor

[57] ABSTRACT

A method and apparatus are provided for laying an offshore pipeline or flowline bundle to a deepwater subsea structure. The pipeline or flowline bundle is laid along a prescribed path, preferably U-shape, such that a pullhead at the terminus of the pipeline or flowline bundle falls just short of the subsea structure. A pull-in tool connected to the pipeline or flowline bundle by a short length of pull cable is then landed on and latched to the subsea structure, and the pipeline or flowline bundle is pulled up to the subsea structure by the pull-in tool and pull cable.

9 Claims, 4 Drawing Figures

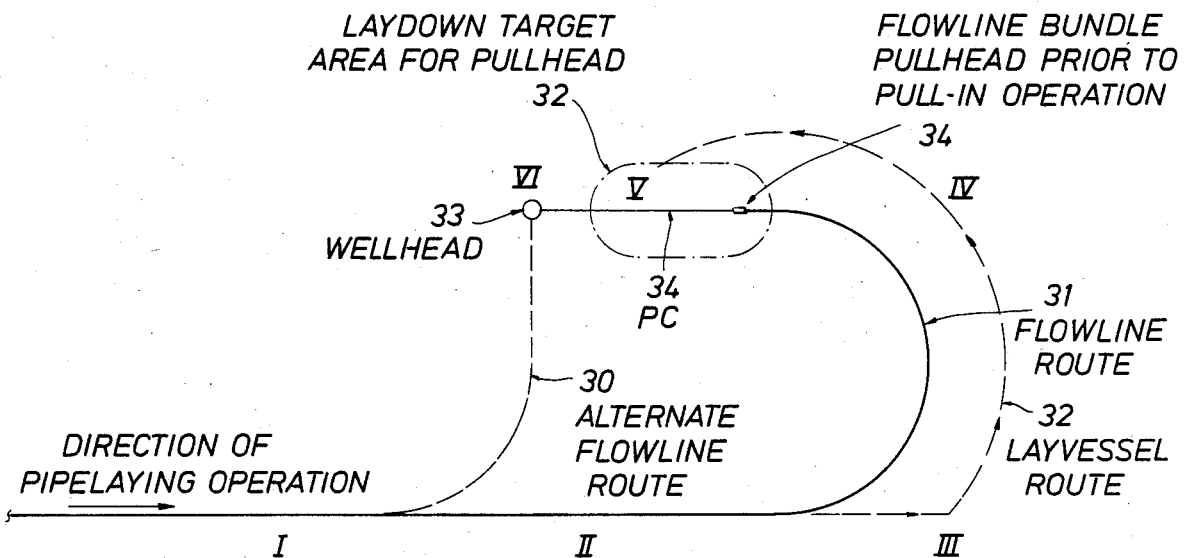
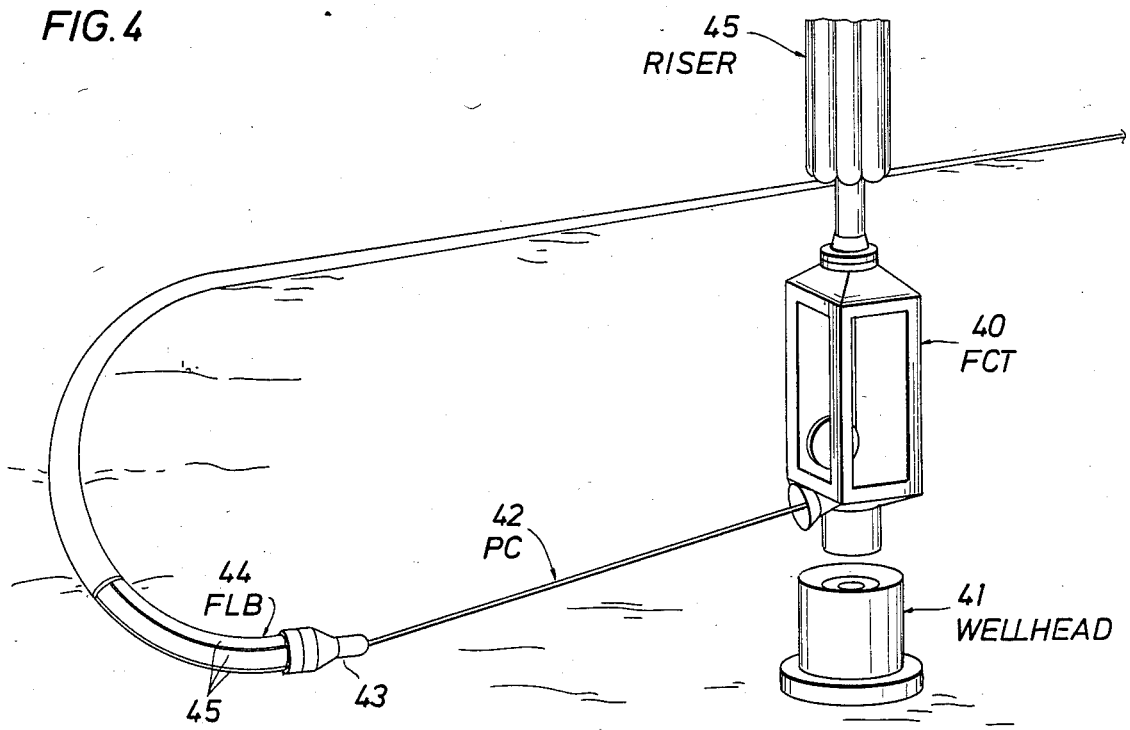

SUBSEA PIPELINE CONNECTION

BACKGROUND OF THE INVENTION

Connecting a pipeline or flowline bundle to a subsea production facility can be a very arduous and time consuming procedure, particularly in deep water. Depending upon the connection technique employed, if the pipeline is laid outside a specific target area, literally months can be spent correcting the error. This is not hard to understand once it is appreciated that the pipeline may be hundreds or even thousands of feet below the pipelay vessel, relatively immobile, and difficult to remotely manipulate. One method for approaching this problem is the so-called lateral deflection technique covered by U.S. Pat. No. 4,145,909. In accordance with that technique, a pipeline is deliberately laid to one side of and somewhat past a subsea production facility, and subsequently the pipeline is bent or deflected to make connection with the facility. This technique, while operable, nonetheless suffers from several drawbacks. First, the pipe end must be laid down into a rather small target area and a means of pulling the pipe end toward the subsea production facility must be established. Second, the lateral deflection technique is at the mercy of unpredictable soil behavior as the pipeline must be pulled across often treacherous terrain as it sweeps toward the subsea production facility. Thus, the approach angle of the pipeline to the production facility is often unpredictable because of boulders or other obstacles which disrupt the motion of the pipeline as it is deflected toward the production facility. This latter problem may be overcome to some extent by cleaning the area over which the pipeline is to be deflected or by supporting the pipe off bottom with a system of buoys and chains as described in U.S. Pat. No. 4,145,909. The lateral deflection technique has the further disadvantage that the area swept out by the pipeline as it is deflected toward the subsea facility is large and this area is then unavailable for the installation of other equipment. A related drawback resides in the stresses introduced into the pipeline not only because of the boulders and other obstacles in the path of deflection which in an extreme case may buckle the pipeline, but also in the backward and lateral pulling on the pipeline necessary to deflect it toward the production facility. Even further, the lateral deflection technique is unduly complicated, requiring one or more tow vessels, as well as a drilling vessel to (1) land a pull-in tool onto a large sled at the end of the pipeline, (2) to establish a connection between this sled and a pullcable carried by the pull-in tool, (3) pay out the pullcable between this sled and the production facility, (4) land the pull-in tool on the production facility, and finally (5) perform the deflection and pull-in operations.

Applicant is not aware of any other prior art which, in his judgement as one skilled in the pipeline art, would anticipate or render obvious the novel pipelay technique of the present invention; however, for the purposes of fully developing the background of the invention and establishing the state of the requisite art, the following art is set forth: U.S. Pat. No. 3,431,739.

SUMMARY OF THE INVENTION

The primary purpose of the present invention is to provide a method and apparatus for laying an offshore pipeline or flowline bundle to a subsea structure, which method and apparatus are relatively simple and economical to use and which do not subject the pipeline or flowline bundle to dangerous stresses. Preferably, the pipeline or flowline bundle is laid to the vicinity of the subsea structure by a surface craft and is then drawn the remaining distance to the target by a relatively straightforward pull by pull-means extending from the subsea structure (or at least from closely adjacent to that facility) to the end of the pipeline or flowline bundle. Even more preferably, the pull-means is a pullcable extending from a pull-in tool at the subsea structure. Most preferably, the opposite end of the pullcable from the end attached to the pipeline or flowline bundle either is contained on a pulling winch built into the pull-in tool or extends upwardly from the pull-in tool to a surface craft from which the pull emanates. Also most preferably, the pipeline or flowline bundle is laid in a circuitous path up to the vicinity of the subsea structure, the pull-in tool is then landed onto the subsea structure, and the relatively straightforward pull of the pipeline or flowline bundle the remaining distance to the subsea structure is accomplished by taking some of the slack out of the circuitous portion of the pipeline or flowline bundle.

The primary distinctions of the present invention over the most relevant prior art reside in (1) the laying of the pipe, landing of the pull-in tool, and connecting the pipe to the subsea structure as a single continuous operation, and (2) in the use of a relatively straightforward pull to move the end of the pipeline or flowline bundle the remaining distance to the subsea structure. Feature (2) above, wherein the pipe end is pointed toward the subsea structure throughout the pull, substantially eliminates the dangerous stresses on the pipeline or flowline bundle which occur in the relevant prior art processes. Although the straightforward pull on the end of the pipeline or flowline bundle may result in sweeping a minor area of the seafloor as at least part of a circuitous portion of the pipeline or flowline bundle is straightened out, the pipeline or flowline bundle still is not subjected to dangerous lateral and compressive bending forces as in the above mentioned lateral deflection technique. Rather, the end of the pipeline or flowline bundle is placed substantially facing toward the subsea structure by the surface craft, and the final pull-in of the pipeline or flowline bundle generates a relatively safe tension—not compression—in the pipeline or flowline bundle.

Other purposes, distinctions over the art, advantages and features of the invention will be apparent to one skilled in the art upon review of the following.

BRIEF DESCRIPTION OF THE DRAWINGS

FIG. 3 provides alternative circuitous routes to that shown in FIG. 2.

FIG. 4 shows a flowline connection tool or pull-in tool deployed from a riser and connected by a pullcable to a flowline bundle.

DESCRIPTION OF PREFERRED EMBODIMENTS

Figure 1:
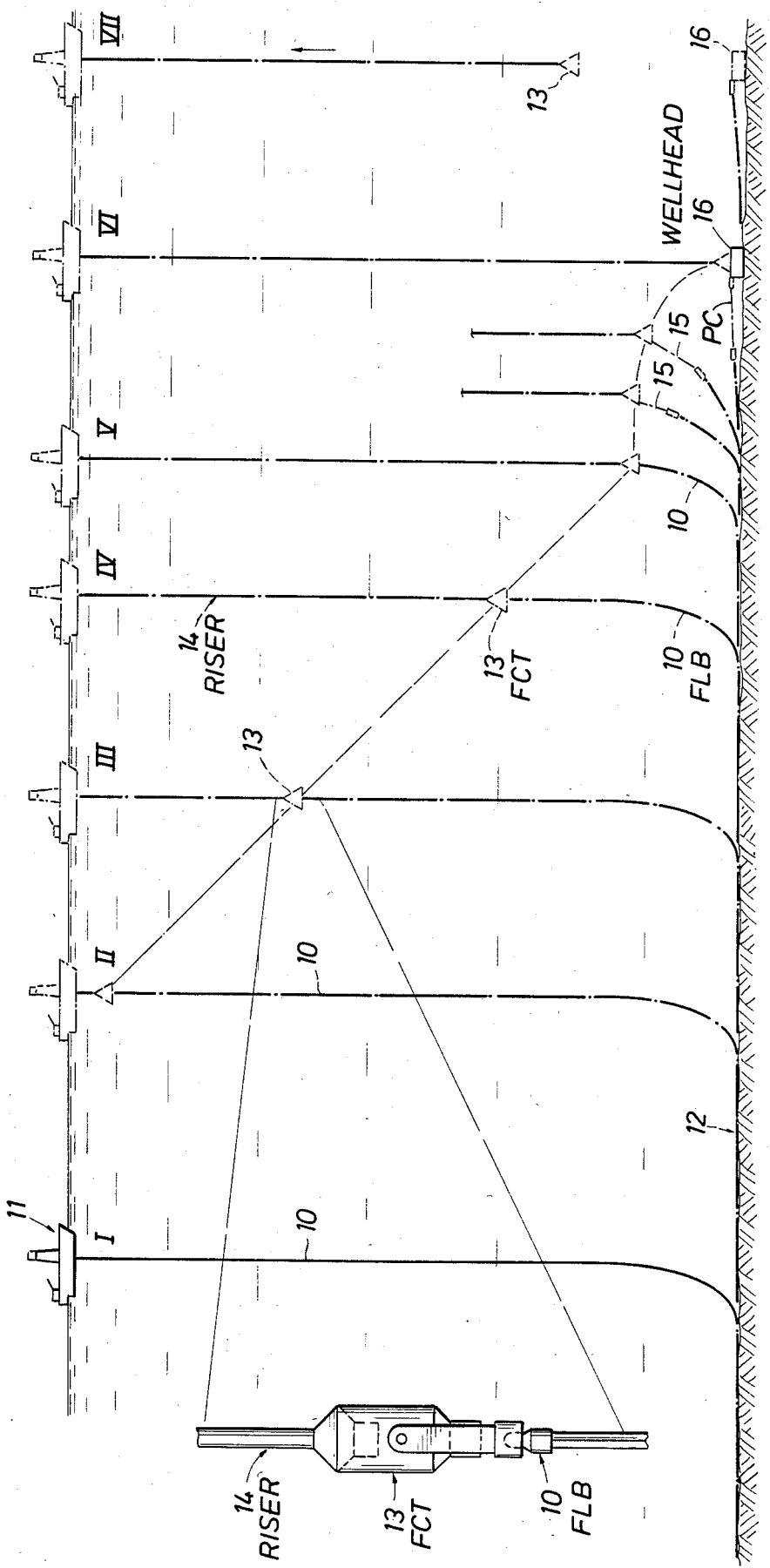
FIG. 1 shows one embodiment of a staged pipelay procedure for laying a pipeline to the vicinity of a subsea structure and then connecting the pipeline to the structure with a pullcable.

The present invention is relevant to embodiments wherein an offshore pipeline or flowline bundle (both "pipeline" and "flowline bundle" hereinafter being termed "flowline") is laid toward a subsea structure such as a production facility which may be an individual subsea wellhead, an underwater manifold center, a tension leg platform base structure, etc. This invention pertains in particular to a method and apparatus for connecting the flowline to the subsea production facility. During the connection operation, the lay-down string between a pipelay vessel (as used hereinafter, "pipelay vessel" will include all "surface craft" suitable for pipelaying) and the seabed typically will include a lay-down riser, a pull-in tool, a relatively short length of pullcable, a pullhead at the end of a flowline, and the flowline.

The connection of the flowline to the subsea structure is accomplished by first laying the flowline along a prescribed circuitous path, preferably U-shape, on the seabed such that the pullhead lands just short of the subsea production facility. In accordance with one preferred embodiment, to precisely lay the flowline along the prescribed path (such as the aforementioned U-shape path) requires that the upper portion of the lay-down string be maintained in a vertical orientation with zero horizontal tension (although the invention is not limited to this mode of pipelay), that the pipelay vessel accurately follow a certain prescribed route as indicated in FIG. 3, and that the lay-down string be paid out simultaneously and in conjunction with the movement of the pipelay vessel.

The second stage of the connection procedure involves landing and latching the pull-in tool onto the subsea structure. The pullhead at the end of the flowline is then pulled and secured into a socket or receptacle on the subsea structure, by means of the pullcable and the pull-in tool. The next operation may involve removing the nose from the pullhead as well as retracting the pullcable. Finally, the pull-in tool is disconnected from the subsea structure and recovered onto the pipelay vessel.

The present invention is especially advantageous in comparison with the prior art inasmuch as only one vessel is required to lay and connect pipe to the subsea structure. This should be compared to the aforementioned lateral deflection technique of the prior art. Also, since the present invention utilizes only one lay-down string, this minimizes potential tangling and eliminates other problems arising from the need to remotely connect a pullcable onto the end of the pipeline. Further, the present invention facilitates the laying of pipe in close proximity to the subsea structure, prior to the final connection step. With dynamic positioning of the pipelay vessel in accordance with acoustic instrumentation, it is feasible to position the pipeline relative to the subsea structure during lay-down to an accuracy of 2 percent of the water depth. In addition, the lay-down procedure is reversible and can be repeated if desired. Thus, if a mistake is made in the lay-down, it can easily be corrected, unlike the prior art lateral deflection technique. However, the present invention is not restricted to any one pipelay method but easily can be adapted to a tow method, reel method, J-lay method, or laybarge. Preferably, the method of the present invention provides a slack loop of pipeline on bottom, thus minimizing effects of thermal expansion, soil movements, anchor hooking, etc. Also, the present method is not sensitive to the length of the pipeline since the slack loop can be expanded or reduced to accomodate length errors. An additional advantage to the preferred method of pipelay is that lay-down forces are low due to the primary vertical orientation. Similarly, pull-in forces to the subsea structure are low, due to the slack loop and short pull length required to connect the pipeline to the subsea structure. Since the pipelay vessel is thus positioned directly over the subsea structure, acoustic positioning devices work with great accuracy in the method. At no time in the present method is diver intervention necessary.

Having thus generally described the apparatus and method of the present invention, as well as its numerous advantages over the most relevant prior art, the following is a more detailed description thereof given in accordance with specific reference to the drawings.

FIG. 1 shows by sequential stages a pipelay procedure wherein a flowline 10 is laid by vertical pipelaying from vessel 11 to seafloor 12, stage I. In stage II, flowline 10 is capped and a flowline connection tool 13 suspended from riser 14 attached to flowline 10, as more fully shown in the detail. The dotted line shown beginning in stage II reveals the decreasing length of suspended flowline 10 and the increasing length of riser 14 through stages III to V as the flowline connection tool 13 is lowered on vertical riser 14. Stage VI, beginning from Stage V, shows the payout of pullcable 15 from flowline connection tool 13 and the landing of flowline connection tool 13 onto subsea production facility 16, such as a wellhead. Stage VII shows the flowline 10 having been pulled to the subsea production facility and connected thereto by means of flowline connection tool 13 and riser 14, and the retrieval of tool 13 and riser 14 onto vessel 11. This pipe connection method may be referred to as a second end—one vessel technique.

Figure 2:
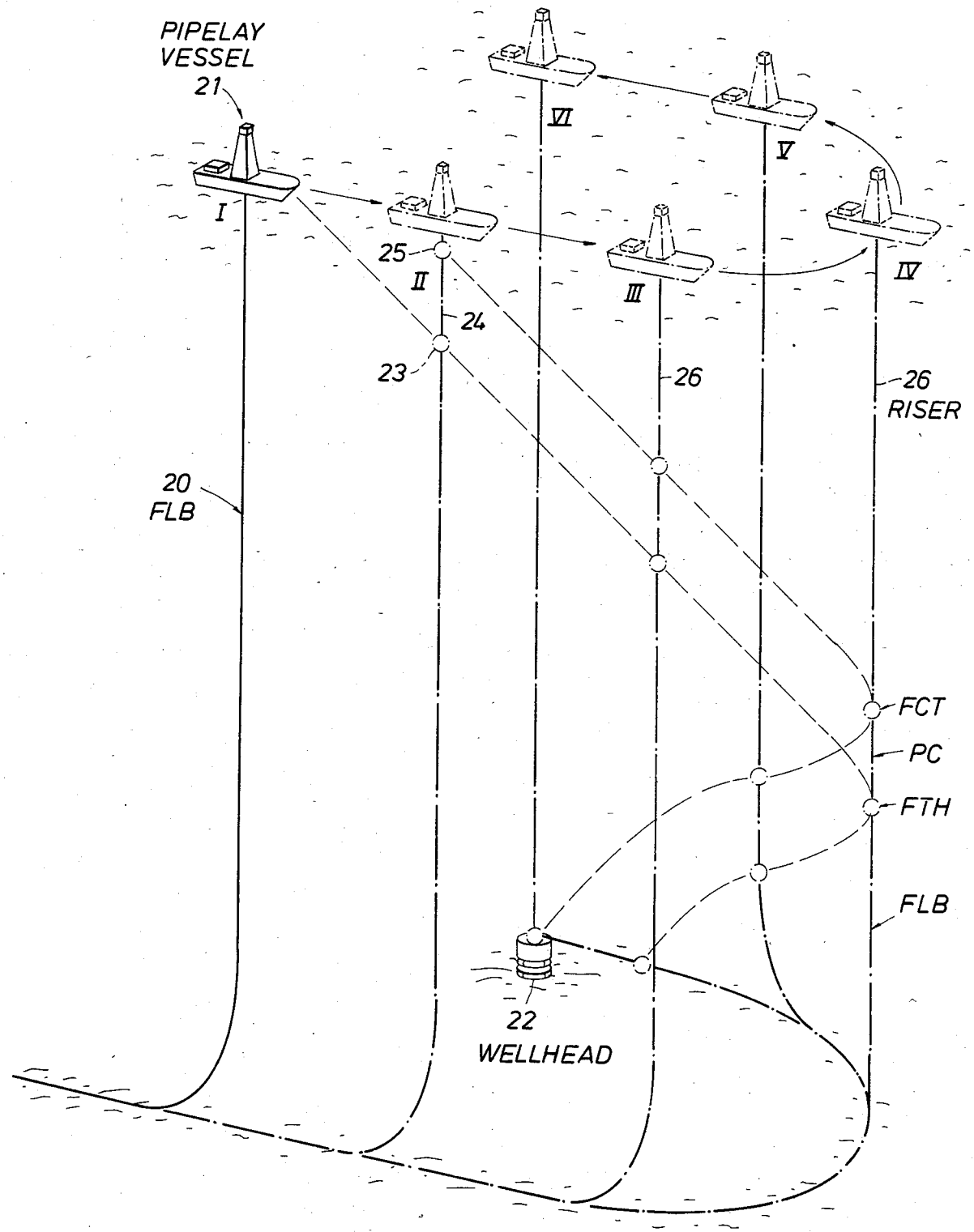
FIG. 2 depicts another embodiment of a staged pipelay procedure for laying a pipeline along a circuitous path to the vicinity of a subsea structure.

FIG. 2 also shows by sequential stages I through VI a pipelay procedure which is a variation of the procedure shown in FIG. 1 in that a flowline 20 is laid from a pipelay vessel 21 via a circuitous path up to a subsea production facility 22 such as a wellhead. A preferred circuitous path is a U-shape as shown in FIG. 2. Stage II shows a flowline terminal head 23 which is connected by a pull cable 24 to flowline connection tool 25 which in turn is connected to riser 26. The embodiment of FIG. 2, in further distinguishment from the embodiment of FIG. 1, shows the pull cable 24 fully deployed in an earlier stage than in FIG. 1 which does not show the pull cable deployed until stage V. An advantage in later deployment of the pull cable is that the pull cable need not bear the full weight of the suspended flowline 20, as is the case in stage II of FIG. 2. In stage III of FIG. 2, the flowline 20 is beginning to be laid along a circuitous path so as to approach the subsea production facility 22 from the backside. As already mentioned, the pipelay procedure is readily reversible to correct any mistake of pipelay in this important part of the procedure. The dotted lines in FIG. 2 follow the paths of the flowline terminal head 23 and the flowline connection tool 25 through stages II through VI. At stage VI the flowline 20 is completely deployed along the sea bottom and the flowline connection tool 25 has been landed onto the subsea production facility 22. The final step, which is not shown in FIG. 2, is to pull the flowline terminal head 23 to the subsea production facility 22, make the connection between the flowline 20 and the subsea production facility, and retrieve the riser 26 and flowline connection tool 25.

An alternate flowline route 30 is shown in FIG. 3 for comparison with the preferred flowline route 31 which is the same as shown in FIG. 2. Alternate route 30 does not provide quite as much slack for the pull-in step and is more prone to misalignment between flowline and production facility. Lay vessel route 32 overlays flowline route 31 through stages I and II but swings outside in stages III through V. A laydown target area is shown just outside of subsea production facility 33 for landing flowline 34 prior to pulling the flowline up to facility 33 with pull cable 34. Laydown target area 32 is fairly large since there is substantial slack in the flowline. Alternate route 30 is but one example of numerous possible flowline routes.

In FIG. 4 is shown a more detailed view of a flowline connection tool 40 about to be landed on a wellhead 41. A pull cable 42 is connected to a flowline terminal head 43 which in turn is connected to flowline 44. Flowline connection tool 40 is suspended from riser 45. While the flowline connection tool is advantageously deployed from a special riser containing all control and instrumentation lines, it is apparent that other means, for example a simple drill pipe with control and instrumentation lines strapped to the outside, could be substituted for the riser.

It may be necessary to orient flowline 44 to a desired position after it is pulled up to flowline connection tool 40 with pull cable 42. Pull head 43 is then removed from the flowline to expose the individual lines 45. After removing flowline connection tool 40, the final operation is to lower a christmas tree (not shown) onto wellhead 41 and, utilizing appropriate mechanisms, establish connection with lines 45, which may include not only fluid production lines but also annulus access lines, hydraulic power lines, electrical control lines, etc.

The foregoing description of the invention is merely intended to be explanatory thereof. Various changes in the details of the described method and apparatus may be made within the scope of the appended claims without departing from the spirit of the invention.

What is claimed is:

1. A method for laying a flowline to a subsea structure comprising:
    laying the flowline to the vicinity of the subsea structure by a circuitous path to form a slack loop in the flowline; and
    drawing the flowline the remaining distance to the subsea structure by forces exerted axially at a point near the end of the flowline.

2. The method of claim 1 wherein the slack loop is U-shaped.

3. The method of claim 1 wherein the terminal part of the flowline is laid from a pull cable extending from a flowline connection tool.

4. The method of claim 3 wherein the pull cable extending from the flowline connection tool is deployed after the flowline is completely on bottom, thereby avoiding the pull cable bearing the full weight of the suspended flowline.

5. The method of claim 4 wherein the flowline connection tool is landed on the subsea structure, and the pull cable is used to pull the flowline up to the subsea structure.

6. A method for laying a flowline to a subsea structure, comprising:
    deploying the flowline from a flowline connection tool connected to a means extending beneath a surface craft, the flowline being laid along a circuitous path to form a slack loop in the flowline;
    after the flowline is substantially deployed to the vicinity of the subsea structure, paying out a pull cable between the flowline connection tool and the flowline and moving the flowline connection tool to the subsea structure;
    landing the flowline connection tool on the subsea structure; and
    pulling the flowline the remaining distance to the subsea structure with the pull cable.

7. The method of claim 6 wherein the slack loop is U-shaped.

8. The method of claim 6 wherein the deployment of the flowline is reversed to correct mistakes of deployment and then redeployed.

9. The method of claim 6 wherein the means extending beneath the surface craft is a riser.

* * * * *